United States Patent
Sullivan et al.

(10) Patent No.: US 7,793,317 B2
(45) Date of Patent: Sep. 7, 2010

(54) SYSTEM AND METHOD OF MANAGING VIDEO STREAMS TO A SET TOP BOX

(75) Inventors: Marc A. Sullivan, Austin, TX (US); Philip T. Kortum, Houston, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 839 days.

(21) Appl. No.: 11/207,567

(22) Filed: Aug. 19, 2005

(65) Prior Publication Data
US 2007/0044119 A1  Feb. 22, 2007

(51) Int. Cl.
H04H 60/32 (2008.01)
H04N 7/173 (2006.01)
H04N 7/16 (2006.01)
H04N 5/44 (2006.01)
H04N 5/91 (2006.01)

(52) U.S. Cl. ............... 725/14; 725/131; 725/139; 725/151; 348/734; 386/83

(58) Field of Classification Search ............ 725/14, 725/21, 68, 100, 131–133, 139–141, 151–153; 348/734; 386/83
See application file for complete search history.

(56) References Cited

U.S. PATENT DOCUMENTS

| 4,808,992 A * | 2/1989 | Beyers et al. ............ 340/825.24 |
| 7,356,246 B1 * | 4/2008 | Kobb ......................... 386/83 |
| 2002/0059588 A1 * | 5/2002 | Huber et al. ................. 725/35 |
| 2003/0009772 A1 * | 1/2003 | Karr .......................... 725/142 |
| 2005/0229226 A1 * | 10/2005 | Relan et al. ................. 725/114 |
| 2006/0031888 A1 * | 2/2006 | Sparrell ...................... 725/78 |
| 2006/0064729 A1 * | 3/2006 | Steading ..................... 725/95 |

FOREIGN PATENT DOCUMENTS

WO   WO 2004057862 A1 * 7/2004

* cited by examiner

*Primary Examiner*—Joseph G Ustaris
(74) *Attorney, Agent, or Firm*—Toler Law Group

(57) ABSTRACT

A method of managing video streams is disclosed and includes monitoring the power to a display device coupled to a set top box. Also, the method includes determining whether the display device is in a low power mode and requesting that a content provider turn off a video stream to the set top box, after determining that the display device is in the low power mode.

17 Claims, 4 Drawing Sheets

SYSTEM AND METHOD OF MANAGING VIDEO STREAMS TO A SET TOP BOX

FIELD OF THE DISCLOSURE

The present disclosure relates to set top boxes.

BACKGROUND

In an Internet protocol (IP) environment, a set top box receives an IP video stream, decodes the IP video stream, and delivers the content from the video stream to a television to which the set top box is connected. The delivery of the IP video stream is typically independent of the state of the television. This can create a significant issue for network loading and utilization. For example, if a customer finishes watching television and turns the television off, the IP video stream continues to flow to the set top box, even though the television is not actively showing the content from the IP video stream. This can lead to a large amount of unnecessary IP bandwidth consumption since the content from the IP video stream is not being consumed. Further, the "wasted" bandwidth can be significant because it can require additional network components to be used to deliver the service. The additional network components can increase the cost of providing the service.

DETAILED DESCRIPTION OF THE DRAWINGS

Figure 1:
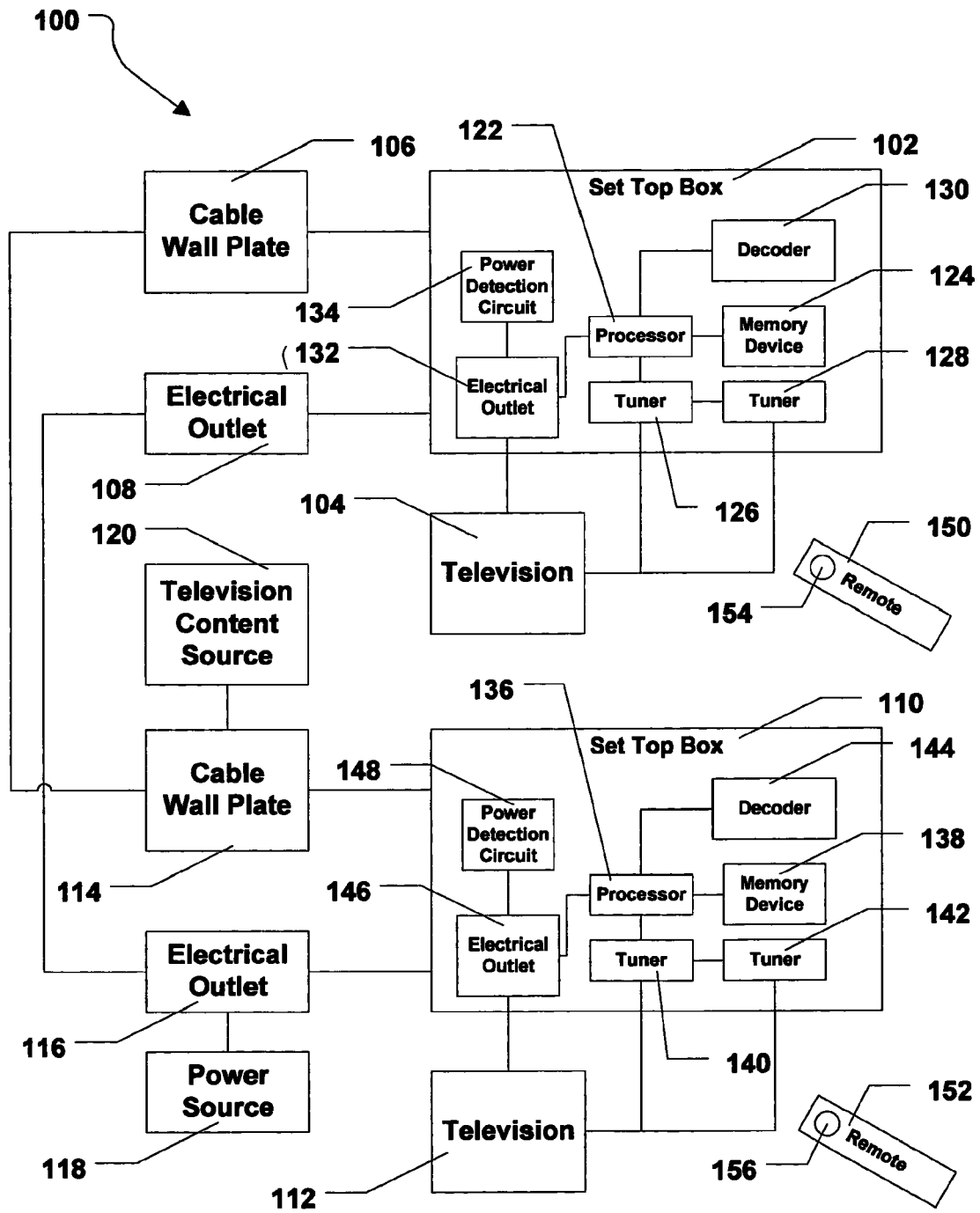
FIG. 1 is a block diagram that is representative of a home entertainment system.

A method of managing video streams is disclosed and includes monitoring the power to a display device coupled to a set top box. Also, the method includes determining whether the display device is in a low power mode and requesting that a content provider turn off a video stream to the set top box, after determining that the display device is in the low power mode.

In a particular embodiment, the low power mode is: a standby mode or a power off mode. Further, in another particular embodiment, the method includes determining whether a recording by a digital video recorder is in progress, after determining that the display device is in a low power mode and before requesting that the content provider turn off the video stream.

In a particular embodiment, the method can include requesting that the content provider turn off the video stream to the set top box after determining that a recording is not in progress. Further, the method can include recording a program provided by the video stream and requesting that the content provider turn off the video stream after the recording of the program is complete.

In yet another particular embodiment, the method includes determining whether a recording by a digital video recorder is scheduled and requesting the video stream a predetermined time before the scheduled recording. In this particular embodiment, the method includes receiving the video stream before the scheduled recording, decoding the video stream before the scheduled recording, and recording the video stream. Moreover, the method includes turning off the video stream after the recording is complete.

In still another particular embodiment, the method includes requesting the video stream when the display device returns to a normal power mode, receiving the video stream, decoding the video stream, and transmitting the decoded video stream to the display device from the set top box.

In another particular embodiment, the method includes monitoring a plurality of set top box controls, and determining whether a user has not selected any of the plurality of set top box controls for a predetermined timeout period. Also, in this particular embodiment, the method can include transmitting a warning for display at a display device that the video stream will be turned off, and determining whether a user input is received in response to the warning. The method can include continuing to receive the video stream when a user input is received before the end of the timeout period. Alternatively, the method can include turning off the video stream when a user input is not received before the end of the timeout period.

In another embodiment, a set top box device is disclosed and includes a computer program that is embedded within a computer readable medium that is accessible to a processor. The computer program includes instructions to monitor the power to a display device that is coupled to a set top box, instructions to determine whether the display device is in a low power mode, and instructions to turn off a video stream to the set top box after determining that the display device is in a low power mode.

In yet another embodiment, a system is disclosed and includes a display device and a set top box device that is coupled to the display device. The set top box device can include a computer program embedded within a computer readable medium that is accessible to a processor. Further, the computer program can include instructions to request that a content provider turn off a video stream to the set top box after the display device is turned off.

Referring to FIG. 1, a non-limiting, exemplary embodiment of a home entertainment system is shown and is generally designated 100. As illustrated in FIG. 1, the home entertainment system 100 includes a first set top box 102 that is coupled to a first display device, such as a first television 104. Also, the first set top box 102 is coupled to a first cable wall plate 106, and a first electrical outlet 108.

FIG. 1 also shows a second set top box 110 that is coupled to a second display device, e.g., a second television 112. Further, the second set top box 110 is coupled to a second cable wall plate 114, and a second electrical outlet 116. In a particular embodiment, the first set top box 102 and the second set top box 110 may incorporate one or more additional features of the general computing system described below in conjunction with FIG. 4.

In a particular embodiment, each electrical outlet 108, 116 is a standard 110/120 volt alternating current (VAC) outlet. Moreover, as shown in FIG. 1, each electrical outlet 108, 116 is coupled to a power source 118, e.g., a 110/120 VAC power source. Each cable wall plate 106, 114 can include a coaxial cable connection, a category five (CAT-5) connection, a registered jack eleven (RJ-11) type connection, or a combination thereof. Additionally, each cable wall plate 106, 114 can be coupled to each other and to a television content source 120, e.g., a digital television content source, via a coaxial cable, CAT-5 cable, or a telephone cable.

As depicted in FIG. 1, the first set top box 102 can include a processor 122 and a memory device 124 that is coupled to the processor 122. Also, the first set top box 102 can include one or more television tuners 126, 128 that are coupled to the processor 122. Additionally, the first set top box 102 can include a decoder 130 that is coupled to the processor 126. As illustrated in FIG. 1, the first set top box 102 also includes an electrical outlet 132 and a power detection circuit 134. In a particular embodiment, a power cord from the first television 104 can be plugged into the electrical outlet 132 at the first set top box 102. Further, in a particular embodiment, the electrical outlet 132 at the first set top box 102 can be a switched outlet that is turned off when the first set top box 102 is turned off.

FIG. 1 indicates that the second set top box 110 can include a processor 136 and a memory device 138 that is coupled to the processor 136. Also, the second set top box 110 can include one or more television tuners 140, 142 that are coupled to the processor 136. Additionally, the second set top box 110 can include a decoder 144 that is coupled to the processor 136. As illustrated in FIG. 1, the second set top box 110 also includes an electrical outlet 146 and a power detection circuit 148. In a particular embodiment, a power cord from the second television 112 can be plugged into the electrical outlet 146 at the second set top box 110. Also, in a particular embodiment, the electrical outlet 146 at the second set top box 110 can be a switched outlet that can be turned off when the second set top box 110 is turned off.

In a particular embodiment, within each set top box 102, 110, the processor 122, 136 can access the memory device 124, 138, for example, to read television content from and write television content to the memory device 124, 138. Each memory device 124, 138 can be a flash memory device or any other type of electrically erasable, programmable, read only memory (EEPROM) device or non-volatile memory device, such as a hard disk drive. Also, each memory device 124, 138 can be a random access memory (RAM) device. In a particular embodiment, each power detection circuit 134, 148 can detect when a television 104, 112 that is receiving power via each set top box 102, 110 is powered on to an operation mode or is powered down to a standby mode or a power off mode.

FIG. 1 also shows a first remote control device 150 and a second remote control device 152. In a particular embodiment, the first remote control device 150 can communicate with the first set top box 102 and the first television 104. Also, the second remote control device 152 can communicate with the second set top box 110 and the second television 112. In an illustrative embodiment, the remote control devices 150, 152 can communicate using infrared (IR) signals. In a particular embodiment, each remote control device 150, 152 can include a global power button 154, 156. When the global power button 154, 156 is pressed, the set top box 102, 110 and the television 104, 112 that are responsive to the remote control device 150, 152 can be turned off or placed in a low power mode, e.g., a standby mode. Also, the global power button 154, 156 can be used to turn on the television 104, 112 and the set top box 102, 110. Further, depending on the state of each television 104, 112, each set top box 102, 110 can request that the content source 120 turn off one or more video streams to each set top box 102, 110. Table 1 illustrates a state table showing the exemplary results based on the state of each television 104, 112 and the action taken by a user.

In a particular embodiment, each television 104, 112 may be turned on for a game system, a digital video disk (DVD) player, a video cassette recorder (VCR), or another video related device. In such a case, the set top box 102, 110 may not be turned on. As such, the video stream to the set top box 102, 110 may not be requested from the content provider.

TABLE 1

Exemplary results based on the state of a TV and user actions.

| State of Television | User Action | Result |
| --- | --- | --- |
| ON | Use remote to turn STB off. | STB switches off power to TV. Video stream turned off. |
| ON | User global power button to turn off STB and TV. | STB and TV turned off. Video stream turned off. |
| ON | Turn TV off directly. | STB detects power off. Video stream turned off. |
| OFF | Use remote to turn STB on. | STB switches power on to TV. Video stream turned on. |
| OFF | Use global power button to turn on STB and TV. | STB and TV turned on. Video stream turned on. |
| OFF | STB turned on. TV turned on directly. | STB detects power on. Video stream turned on. |

Figure 2:
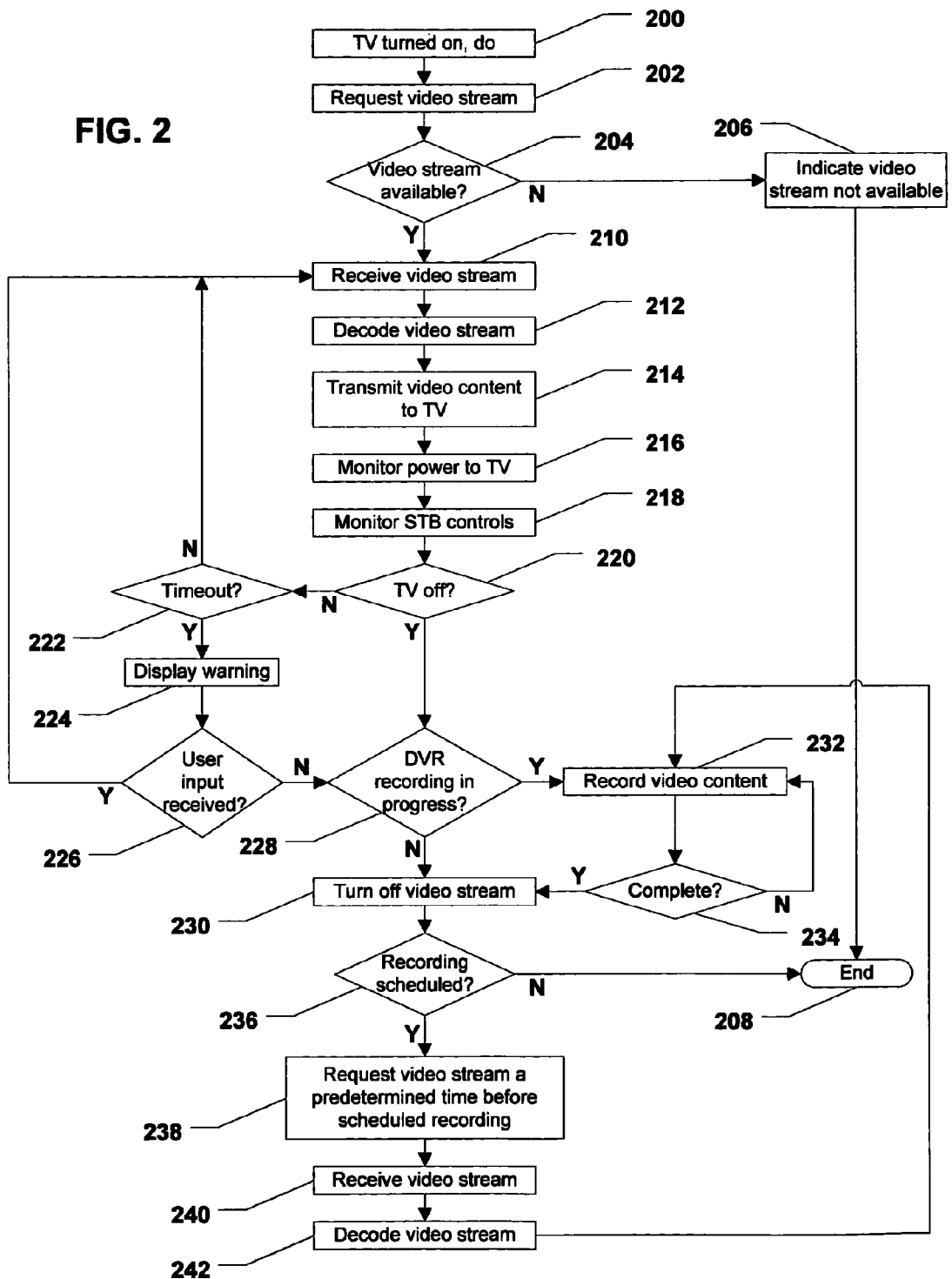
FIG. 2 is a flow chart illustrating a method of managing video streams.

Referring to FIG. 2, a method of managing video streams is depicted and commences at block 200. At block 200, when a television coupled to a set top box is turned on, the set top box, e.g., a program within the set top box, performs the following steps. At block 202, the set top box requests a video stream from a content provider. Moving to decision step 204, the set top box determines whether a video stream is available, e.g., based on the available bandwidth to the set top box. For example, a particular set top box may only have bandwidth available for four video streams. As such, if all four video streams are transmitted to a customer premise, e.g., to two set top boxes, and a user requests a fifth video stream, e.g., at a third set top box, the third set top box can determine that a video stream is not available. At decision step 204, when a video stream is not available, the method proceeds to block 206 and the set top box indicates that a video stream is not available. The method then ends at state 208.

Returning to decision step 204, when a video stream is available, the method proceeds to block 210 and the set top box receives the video stream from the content provider. Proceeding to block 212, the set top box decodes the video stream. At block 214, the set top box transmits video content to a television coupled to the set top box. Moving to block 216, the set top box monitors the power to the television. In a particular embodiment, the set top box can monitor the power to the television using a power detection circuit coupled to an outlet into which a power cord from the television is plugged. At block 218, the set top box monitors a plurality of set top box controls, e.g., volume up, volume down, channel up, channel down, pause, stop, rewind, fast forward, play, record, etc.

Continuing to decision step 220, the set top box determines whether the television is turned off. If the television is not turned off, the method proceeds to decision step 222 and the set top box determines whether a timeout has occurred. For example, if a user does not access any of the set top box controls for a predetermined period of time, e.g., four hours, a timeout can occur. In a particular embodiment, a timeout can be an indication that a user is not watching a television that is turned on. At decision step 222, if a timeout does not occur, the method returns to block 210 and continues as depicted. On the other hand, at decision step 222, when a timeout occurs, the method moves to block 224 and the set top box displays a warning at the television. For example, the warning can indicate to a user that a video stream will be turned off due to inactivity at the set top box and that the user can press any button on a remote control to prevent the video stream from being turned off.

Proceeding to decision step 226, the set top box determines whether a user input is received. If a user input is received, the method returns to block 210 and continues as illustrated. Conversely, at decision step 226, if no user input is received, the method continues to decision step 228. Decision step 228 can also be reached from decision step 220 when the set top box determines that the television is turned off.

At decision step 228, the set top box determines whether a recording by a digital video recorder is in progress. If a recording is not in progress, the method proceeds to block 230 and the video stream is turned off. In a particular embodiment, the video stream is turned off by a content source, or content provider, in response to a request by the set top box to have the video stream turned off.

At decision step 228, when a recording is in progress, the method moves to block 232 and the set top box continues to record the video content from the video stream. Thereafter, at decision step 234, the set top box determines whether the recording is complete. If the recording is not complete, the method returns to block 232 and continues as shown. When the recording is complete, the method proceeds to block 230 and the video stream is turned off.

Moving to decision step 236, the set top box determines whether a recording is scheduled. If no recording is scheduled, the method ends at state 208. On the other hand, if a recording is scheduled, the method continues to block 238 and the set top box requests a video stream from a content provider at a predetermined time before the scheduled recording. In a particular embodiment, the video stream can be requested within five minutes or less of the scheduled recording. At block 240, the set top box receives the video stream from the content provider. Next at block 242, the set top box decodes the video stream. The method then proceeds to block 232 and continues as described.

Figure 3:
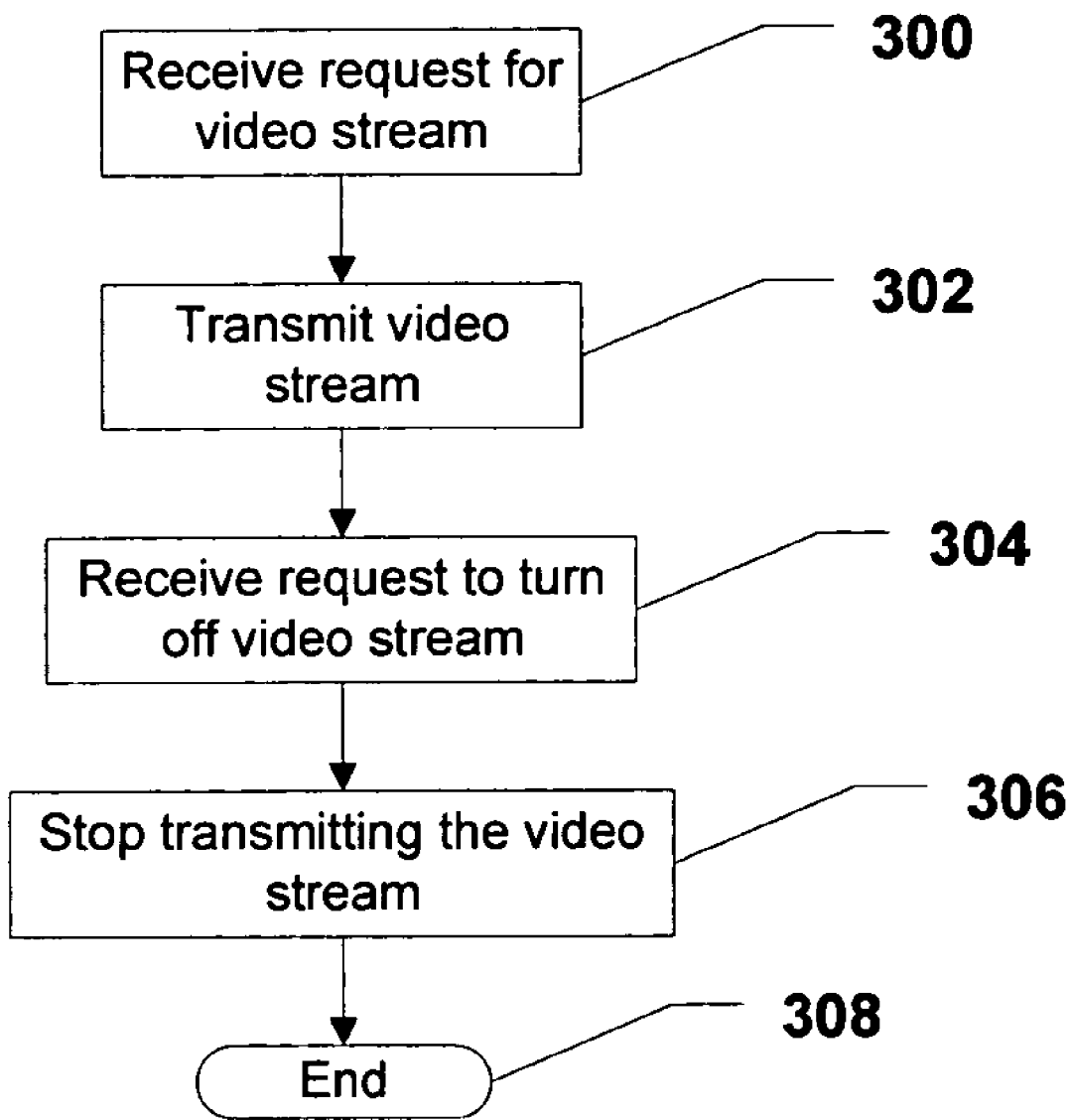
FIG. 3 is a flow chart illustrating another method of managing video streams.

FIG. 3 illustrates another method of managing video streams. At block 300, a content provider, or content source, receives a request for a video stream, e.g., from a set top box after the set top box is turned on. At block 302, the content provider transmits a video stream to the set top box.

Moving to block 304, the content provider receives a request from a set top box to turn off, or stop the transmission, of the video stream. At block 306, the content provider stops transmitting the video stream to the set top box. The method then ends at state 308.

Figure 4:
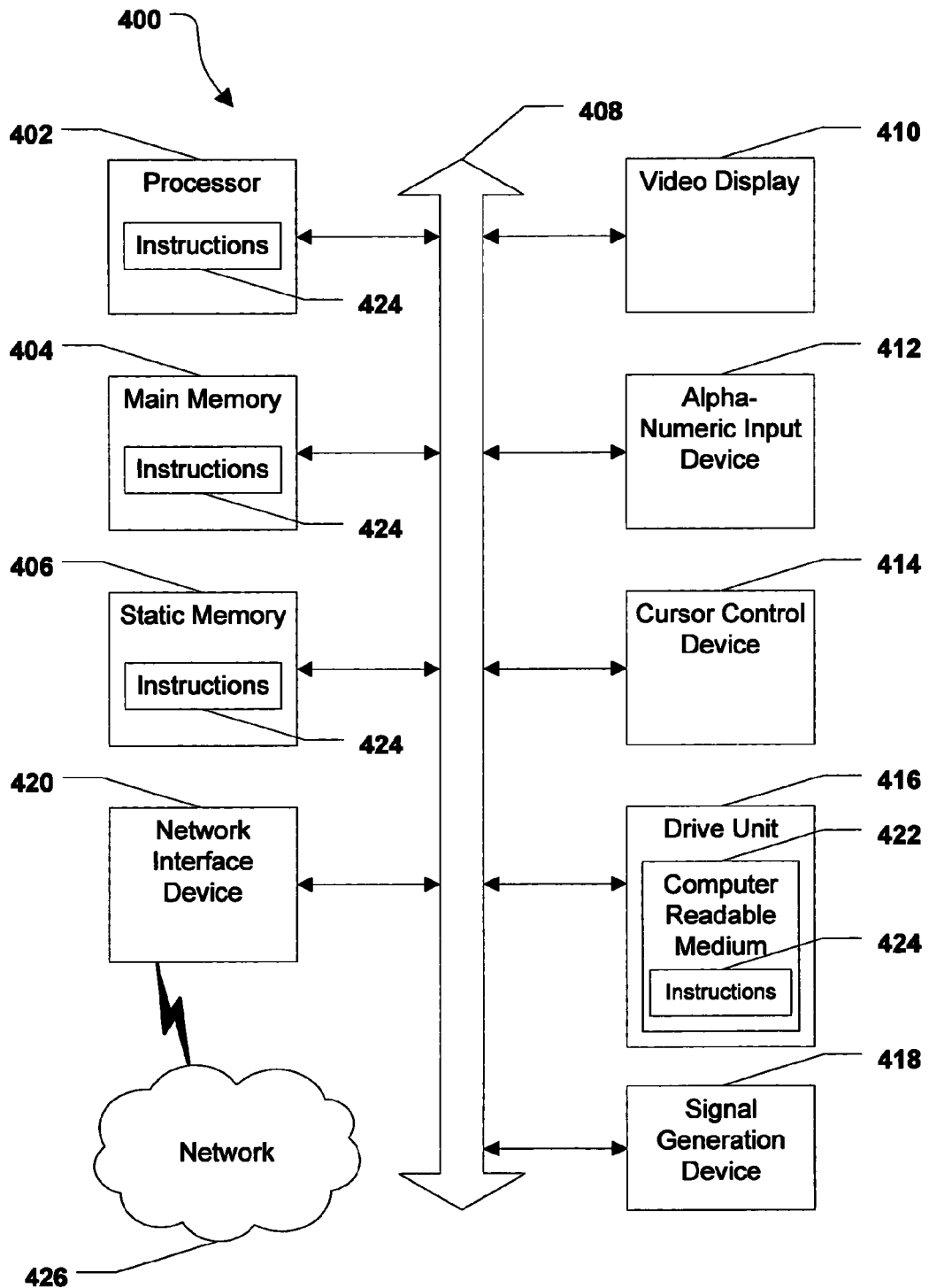
FIG. 4 is a block diagram that is representative of a general computer system.

Referring to FIG. 4, an illustrative embodiment of a general computer system is shown and is designated 400. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. Moreover, the computer system 400 can include a main memory 404 and a static memory 406 that can communicate with each other via a bus 408. As shown, the computer system 400 may further include a video display unit 410, such as a liquid crystal display (LCD), an organic light emitting diode (OLED), a flat panel display, a solid state display, or a cathode ray tube (CRT). Additionally, the computer system 400 may include an input device 412, such as a keyboard, and a cursor control device 414, such as a mouse. The computer system 400 can also include a disk drive unit 416, a signal generation device 418, such as a speaker or remote control, and a network interface device 420.

In a particular embodiment, as depicted in FIG. 4, the disk drive unit 416 may include a computer-readable medium 422 in which one or more sets of instructions 424, e.g. software, can be embedded. Further, the instructions 424 may embody one or more of the methods or logic as described herein. In a particular embodiment, the instructions 424 may reside completely, or at least partially, within the main memory 404, the static memory 406, and/or within the processor 402 during execution by the computer system 400. The main memory 404 and the processor 402 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 424 or receives and executes instructions 424 responsive to a propagated signal, so that a device connected to a network 426 can communicate voice, video or data over the network 426. Further, the instructions 424 may be transmitted or received over the network 426 via the network interface device 420.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

With the configuration of structure described above, the system and method of managing video streams at a set top box provides a way for a set top box to request that one or more video streams to the set top box be turned off when a television coupled to the set top box is not turned on and a recording by a digital video recorder is not in progress. As such, an amount of bandwidth that is wasted within a system that provides video streams to plural set top boxes can be reduced.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of managing video streams, the method comprising:
    determining whether a display device is powered on to display content from a video source other than a set top box;
    determining whether one of a plurality of controls of the set top box is selected within a timeout period after the display device is powered on;
    transmitting a warning for display at the display device that a video stream will be turned off after a timeout period;
    determining whether a recording by a digital video recorder is in progress; and
    automatically sending a request to a content provider to turn off the video stream to the set top box, the request sent in response to determining that the display device is powered on to display content from the video source other than the set top box and that a recording by the digital video recorder is not in progress.

2. The method of claim 1, further comprising:
    recording a program provided by the video stream; and
    after the recording of the program is complete, automatically sending the request to the content provider to turn off the video stream.

3. The method of claim 1, further comprising:
    determining whether a second recording by the digital video recorder is scheduled; and
    sending a second request to the content provider to provide the video stream a predetermined time before the second recording is scheduled.

4. The method of claim 3, further comprising:
    receiving the video stream before the second recording is scheduled;
    decoding the video stream before the second recording is scheduled; and
    recording the video stream.

5. The method of claim 4, further comprising sending a second request to the content provider to turn off the video stream after the second recording is complete.

6. The method of claim 1, further comprising:
requesting the video stream when the display device returns to a normal power mode;
receiving the video stream;
decoding the video stream; and
transmitting the decoded video stream to the display device from the set top box.

7. The method of claim 1, wherein determining whether one of the plurality of controls of the set top box is selected further comprises monitoring one or more of a volume up control, a volume down control, a channel up control, a channel down control, a fast forward control, a reverse control, a play control, a pause control, a stop control, and a record control.

8. The method of claim 1, further comprising determining whether a user input is received in response to transmitting the warning.

9. The method of claim 8, further comprising continuing to receive the video stream when the user input is received before the end of the timeout period.

10. The method of claim 8, further comprising turning off the video stream when the user input is not received before the end of the timeout period.

11. The method of claim 1, wherein the video source other than the set top box is one of a digital video disk player and a videocassette recorder.

12. A set top box device, comprising
a computer program embedded within a computer readable medium that is accessible to a processor, wherein the computer program comprises:
instructions to determine whether a display device is displaying content from a video source other than a set top box device;
instructions to determine whether one of a plurality of controls of the set top box is selected within a timeout period after the display device is powered on;
instructions to transmit a warning for display at the display device that a video stream will be turned off after a timeout period;
instructions to determine whether a recording by a digital video recorder is in progress;
instructions to automatically send a request to a content provider to turn off the video stream to the set top box device, the request sent in response to determining that the display device is displaying content from a video source other than the set top box device and that a recording by the digital video recorder is not in progress.

13. The set top box device of claim 12, further comprising a power outlet to which the display device is coupled and a low power detection circuit coupled to the power outlet.

14. The set top box device of claim 13, wherein the set top box device requests that at least one video stream to the set top box be turned off by a content provider when the power detection circuit detects that the display device is turned off.

15. The set top box device of claim 14, wherein the set top box device requests the at least one video stream from the content provider when the set top box device is turned on and the power detection circuit detects that the display device is turned on.

16. The set top box device of claim 12, wherein the video source other than the set top box device is one of a digital video disk player and a videocassette recorder.

17. The set top box device of claim 12, further comprising:
instructions to determine whether a user input is received in response to transmitting the warning; and
instructions to send a second request to the content provider to turn off the video stream when the user input is not received before the end of the timeout period.

* * * * *